D. K. ALLISON.
MACHINE FOR WEIGHING WATER.
APPLICATION FILED JULY 8, 1916.
1,287,567.
Patented Dec. 10, 1918.
2 SHEETS—SHEET 2.
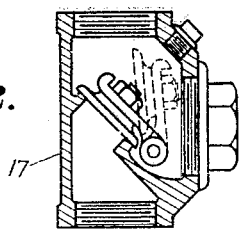
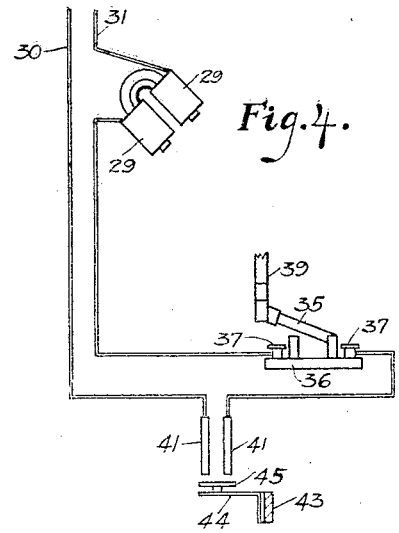
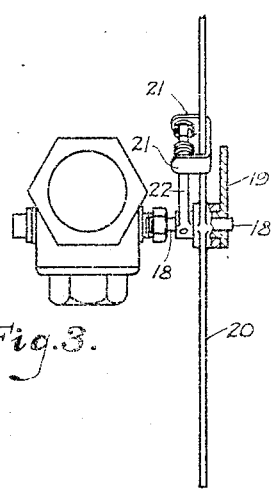
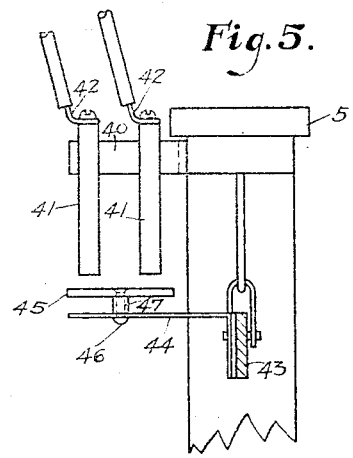
Witnesses
P. A. Hassmann.
Wm. Hust.
Inventor
Daniel K. Allison

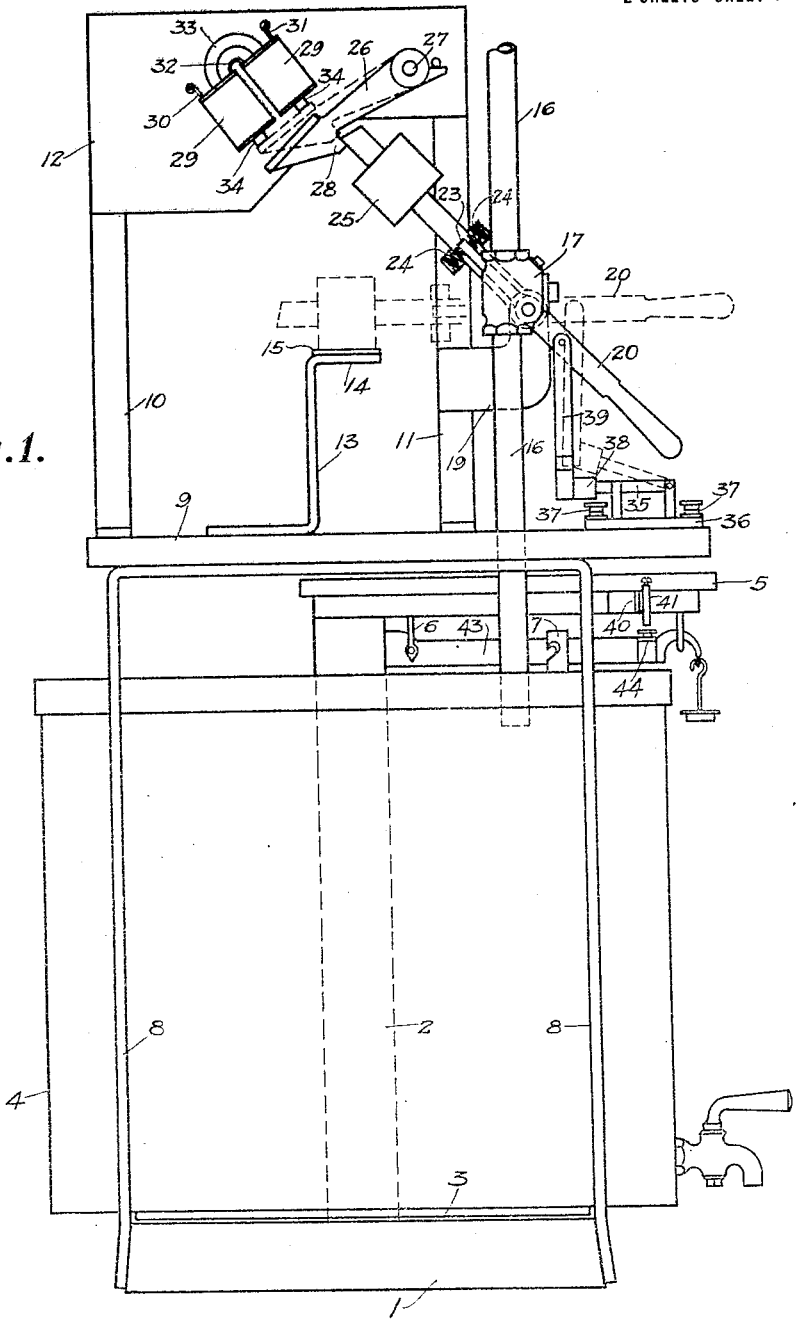

UNITED STATES PATENT OFFICE.

DANIEL K. ALLISON, OF CINCINNATI, OHIO, ASSIGNOR TO THE J. H. DAY COMPANY, OF CINCINNATI, OHIO, A CORPORATION OF OHIO.

MACHINE FOR WEIGHING WATER.

1,287,567.   Specification of Letters Patent.   Patented Dec. 10, 1918.

Application filed July 8, 1916. Serial No. 108,108.

*To all whom it may concern:*

Be it known that I, DANIEL K. ALLISON, a resident of Cincinnati, in the county of Hamilton and State of Ohio, have invented a certain new and useful Machine for Weighing Water, of which the following is a specification.

My invention relates to machines for weighing water, and it is especially adapted for use in bakeries where batches of dough are made, and in which the weight of the flour and water contained therein bear a definite ratio. In such cases, as the quantity of dough in the different batches may vary from day to day, according to the best practice the flour for a certain batch is weighed and the weight of the water to be used in said batch is determined. Now the object of my invention is to set the poise on the scale beam corresponding to the weight of water required for a batch, turn on the water by opening a valve, and provide mechanism whereby the water's flow will be cut off when the scale beam balances.

I attain this object by the method illustrated in the accompanying drawings in which Figure (1) is an elevation of my machine; Fig. (2) is a transverse vertical section through the valve 17; Fig. (3) is a plan view of said valve and connecting parts; Fig. (4) is a diagram of the electric wires used with the machine; Fig. (5) is a partial view of the framework of the scale, showing a cross section of the scale beam and connecting parts.

1 is the base of a platform scale. 2 represents the upright frame in which the usual connecting rod is housed. 3 is the platform of the scale. 4 is a tank setting on said platform. 5 represents the cap from which the scale beam is suspended by the link 6. 7 represents the poise of the scale beam. The bars 8—8 are securely fastened to the base 1, and support the platform 9. The bars 10 and 11 are mounted on the platform 9 and support the plate 12 at their upper ends. The bar 13 is also securely mounted on platform 9 and has a horizontal portion 14. 15 is a leather pad secured to the part 14. 16 is a pipe, the lower end of which extends inside of tank 4. This pipe 16 is provided with the valve 17 which is a type of check valve having a laterally extending shaft 18. In Fig. (2) the full lines show the valve in its closed position, in which case water cannot flow through it. The broken lines indicate the valve in its open position, in which water will flow through it. The angle plate 19 is securely fastened to bar 11 and at its upper extremity furnishes support for the extending shaft 18. The lever 20 is loosely mounted on said shaft 18 and has secured to it the yoke 21. Lever 22 is securely fastened to shaft 18, and its upper extremity 23 is held between the coil springs 24—24. The weight 25 is mounted near the upper end of the lever 20. 26 is a latch pivotally mounted on the pin 27. The latch 26 is provided with a projection 28. 29—29 is an electro-magnet. 30 shows the magnet wire passing through plate 12, and 31 is a similar arrangement. 32 is a magnet wire connecting the two coils of the magnet. 33 is the horseshoe shaped core of the magnet. 34—34 are the contact ends of said core. 35 is a single knife switch for electric circuit, mounted on the insulating plate 36. The electric wires are connected to parts 37 in the usual manner. The handle 38 of the switch 35 is connected to the lever 20 by the connecting link 39. Bar 40 is securely fastened to cap 5. The bars 41—41 are securely fastened to bar 40, and electric wires 42—42 are connected to the upper ends thereof in the usual manner. The scale beam 43 has secured to it the angle shaped bar 44 which carries the horizontal bar 45 by means of the pin 46 and the sleeve 47. Proper insulation is furnished wherever necessary to prevent short circuiting or grounding of the current. The angle shaped bar 44 is insulated from the scale beam 43 by any suitable insulating material. The upper part of the frame and cap 5 are made of wood which obviates the necessity of insulation for the bar 40. In my invention the scale beam is entirely independent of the electric circuit. While the scale beam closes the electric circuit by elevating the bar 45 the electric current does not enter the beam 43. The electric wires 30 and 31 may be connected to the light or power wires of the building, or may be connected to a storage battery, or any other suitable source of electric energy.

My invention is applicable to other types of weighing scales besides that shown in the drawings.

The operation of the machine is as follows:

In Fig. (1) the lever 20 is shown in a horizontal position by broken lines. When in this position, the valve is closed. First, the poise 7 is set to the proper indicated weight which throws the scale out of balance by the beam dropping. The lever 20 is then by hand pressure pulled into the position shown by full lines, when the latch 26 will drop and retain it in this position by the projection 28. The valve 17 is now open, and water begins to flow through the pipe 16 into the tank 4. Pulling the lever 20 into the position shown by full lines, through the link 39, closes the knife switch 35. When sufficient water is in the tank 4 the scale beam 43 will rise, and the bar 45 will contact with the bars 41—41, and thereby close the electric circuit. As soon as the circuit is closed electric current flows through the electro-magnet 29 at which instant the said magnet will lift the latch 26 into the position shown by broken lines, in which event the lever 20 will be released, and its weight 25 will cause it to drop into the position indicated by broken lines, thereby closing the valve 17. At the same instant the knife switch 35 will be raised into the position indicated by broken lines, thereby breaking the circuit at this point. The leather pad 15 serves to relieve the jar incident to the falling of the weight 25. It is desirable to have the electric current flow no longer than is necessary to energize the electro-magnet 29 sufficiently to lift the latch 26. The reason for shortening the flow of current is to preserve the contact bars 41—41 and 45 from corroding. When the beam 43 rises and the bar 45 contacts bars 41—41, the latch 26 and lever 20 operate so quickly that the switch 35 is opened before the beam 43 reverses its motion and withdraws bar 45 from bars 41—41; and thereby prevents any sparks or flame which would be caused by such withdrawal in case the circuit were not otherwise broken.

I claim:

1. In a machine for weighing water, a weighing scale provided with a scale beam, a water pipe provided with a valve, means for opening said valve, means for retaining said valve in an open position, an electric circuit independent of the scale beam, means attached to the scale beam but insulated therefrom for closing the electric circuit when the scale beam balances and an electro-magnet for releasing the retaining means when the electric circuit is closed.

2. In a machine for weighing water, a weighing scale provided with a receptacle for holding water, a pipe for delivering water to said receptacle, a valve for said pipe, a hand lever for operating said valve, a spring connection between said hand lever and said valve, a latch for retaining said valve in an open position, and an electro-magnet for releasing said valve.

3. In a machine for weighing water, a weighing scale provided with a receptacle for holding water and a scale beam, a pipe provided with a valve for delivering water into said receptacle, a hand lever for opening said valve, a latch for retaining said valve in an open position, an electric circuit independent of said scale beam, an electro-magnet in said circuit for releasing said latch and means attached to the scale beam but insulated therefrom for automatically closing the circuit when the scale beam balances.

DANIEL K. ALLISON.

Witnesses:
 WM. HUST,
 F. A. HASSMANN.